Sept. 16, 1958  W. H. ODLUM ET AL  2,852,047
TILTING AND ELEVATING MECHANISM FOR A DISC TYPE TABLE SAW
Filed April 16, 1956  3 Sheets-Sheet 1

INVENTORS
William H. Odlum
William F. Hosford
BY
Attorney

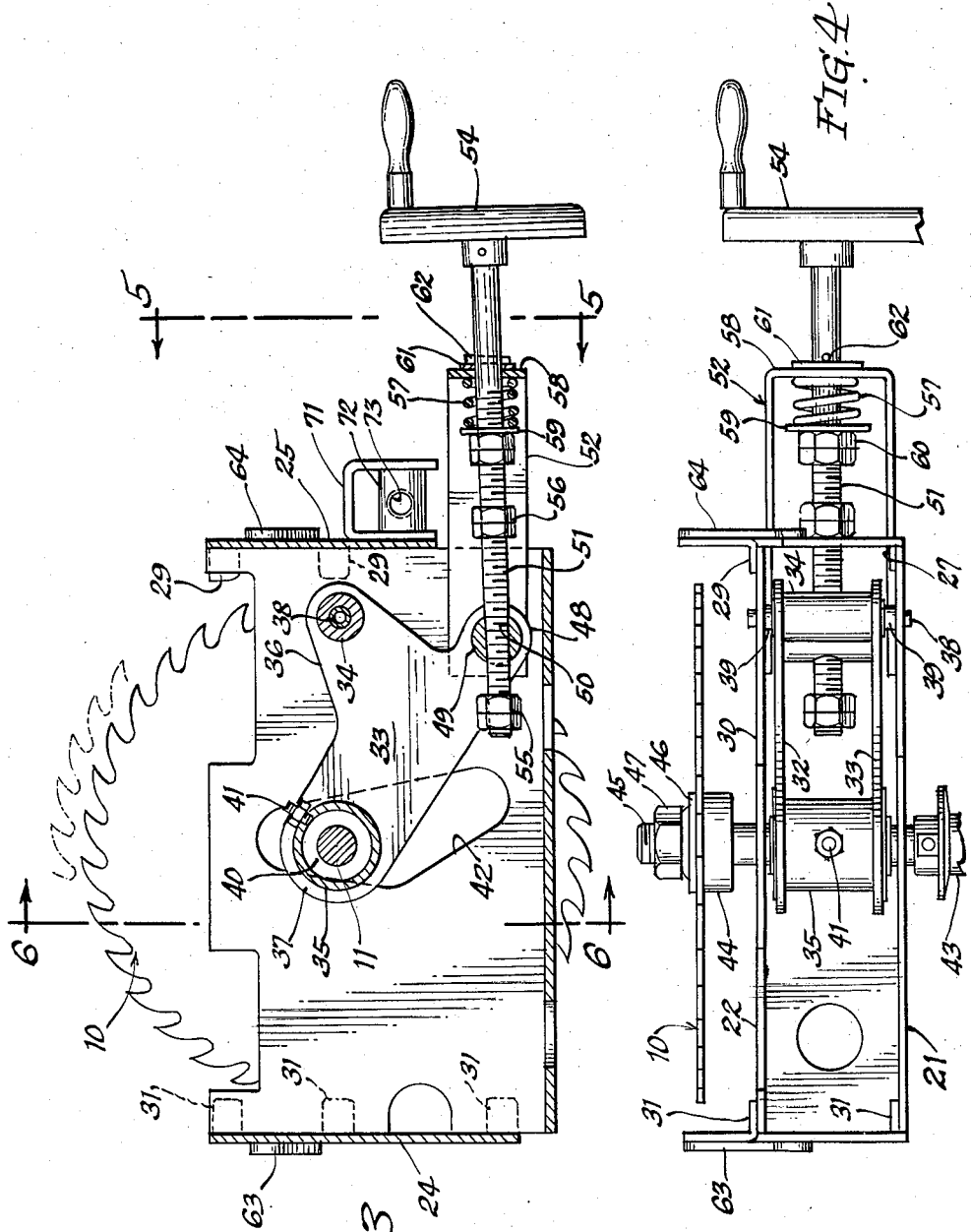

United States Patent Office 2,852,047
Patented Sept. 16, 1958

2,852,047

TILTING AND ELEVATING MECHANISM FOR A DISC TYPE TABLE SAW

William H. Odlum, Wilmette, and William F. Hosford, Chicago, Ill., assignors to Duro Metal Products Co., Chicago, Ill., a corporation of Illinois Application April 16, 1956, Serial No. 578,513

1 Claim. (Cl. 143—35)

This invention relates to a tilting and elevating mechanism for a disc type table saw.

It is a general object of this invention to provide a tilting and elevating mechanism for a circular or disc type table saw which will be more rigid than those presently in use but which nevertheless will be less expensive to make.

It has been customary in tilt arbor saws to provide a supporting mechanism for the saw which will enable the saw spindle to be raised or lowered relative to the saw table, to regulate the depth of cut and which will also allow the saw to be tilted with respect to the table to produce an angular cut. This mechanism incorporates supports for the spindle and elevating and tilting mechanism which are made as castings and subsequently machined to assume the required form, and to receive the necessary bearings and fasteners for the elevating and tilting screws. These castings and their attendant machining operations are costly and it is accordingly among the more specific objects of this invention to fabricate the elevating and tilting mechanism from sheet metal stampings in lieu of castings to reduce the cost thereof while at the same time increasing their rigidity.

A further specific object of this invention has within its purview the provision of a spindle-supporting assembly for a tilt arbor saw which is adaptable either to direct operation for altering the angle of the saw blade relative to the saw table, or to the application of a screw thereto for providing better control over the tilting mechanism.

These and other objects of this invention will become apparent from the following detailed description when taken together with the accompanying drawings in which, Fig. 1 is a side elevational view, partly in section, of a circular table saw to which the present invention has been applied;

Fig. 3 is a greatly enlarged side elevational view in section of the mechanism for raising and tilting the saw;

Fig. 4 is a plan view of the mechanism of Fig. 3;

Figures 1, 2:
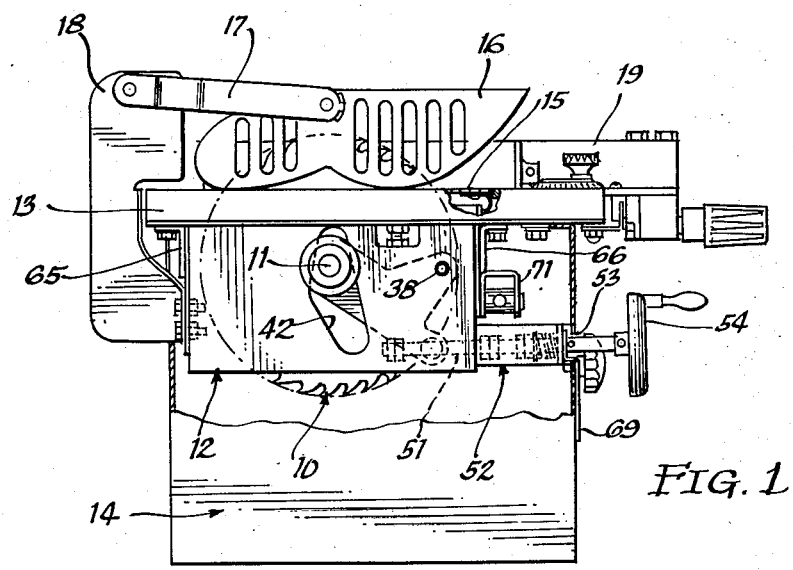
Fig. 2 is a front elevational view of the saw of Fig. 1.

Referring now to Fig. 1 for a general description of the environment for the present invention there is shown a circular saw 10 mounted on an arbor 11 which in turn is supported in an elevating and tilting mechanism which bears the reference character 12, the mechanism being secured to the underside of a table 13. The table 13 is, in turn, supported on a substantially rectangular frame 14 which may be mounted on a bench or other relatively elevated structure. Saw 10 may be made to protrude above the top 15 of table 13 through a slot (not shown) in the table and may be provided with a guard 16 connected by a pivoted link 17 to a supporting plate 18 secured to the rear of the mechanism 12. A suitable fence 19 of known construction may be applied to the table 13 to guide the work as it is advanced relative to saw 10. It is contemplated that mechanism 12 will be so constructed that arbor 11 may be raised or lowered relative to table top 15 and that the circular saw 10 may also be tilted.

Figure 5:
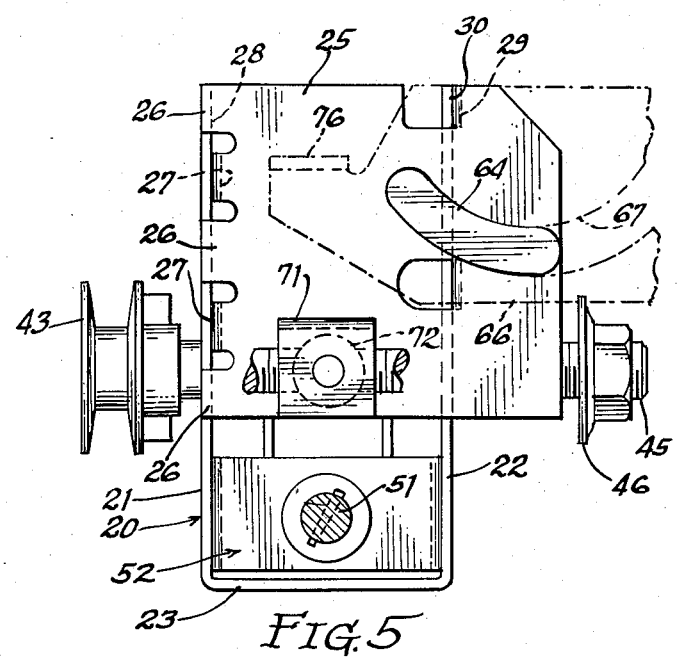
Fig. 5 is a front elevational view of the mechanism of Fig. 3, the view being taken in the direction of the arrows 5—5 of Fig. 3.
Figure 6:
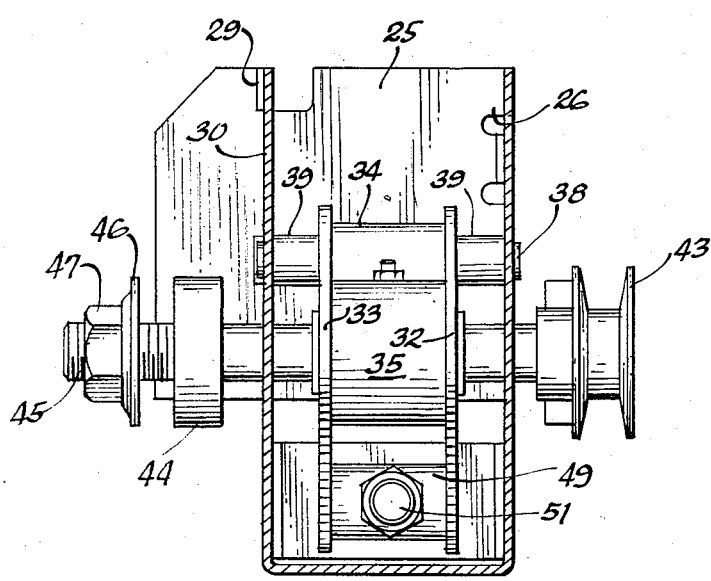
Fig. 6 is a rear elevational view in section of the mechanism of Fig. 3, the view being taken in the direction of the arrows 6—6 of Fig. 3.

The tilt arbor raising and tilting mechanism 12 is shown in greater detail in Figs. 3 to 6 inclusive. Referring particularly to Figs. 5 and 6 it may be observed that the mechanism is comprised in general of a U-shaped stamping 20 having substantially parallel sides 21 and 22 connected by a bottom portion 23.

The ends of the stamping are closed by end plates 24 and 25 (Fig. 3). End plate 25 is located relative to sides 21 and 22 by alternate tongues 26 and angularly bent tabs 27 formed integrally with plate 25 and disposed to provide a butt joint between the tongues 26 and the adjacent end of side 21, and a lap joint between the tabs 27 and the interior surface 28 of side 21. Tabs 29 (Fig. 4) overlap the outer surface 30 of side 22. Sides 21 and 22 are secured to end plate 25 by spot welding tabs 27 and 29 to said sides, the tongues 26 serving to locate the plate relative to side 21, and the abutting relation of the plate to the end of side 22 serving to locate said plate with respect to said side 21.

Rear end plate 24 is similarly provided with tabs 31 (Figs. 3 and 4) by which it may be spot welded to the sides 21 and 22.

It may be apparent from the description thus far given that the U-shaped single-piece sides and bottom, together with the spot welded end plates 24 and 25, constitute a rigid structure for supporting the saw 10.

The mechanism for raising and lowering the saw arbor 11 relative to mechanism 12 is comprised of a pair of heavy three-armed stamped plates 32, 33 (Figs. 3, 4 and 6) which are secured to tubular bushings 34 and 35, the bushings having substantially parallel axes. Bushing 34 connects together the free ends of corresponding arms 36 of the plates 32, 33 and bushing 35 connects together the free ends of corresponding arms 37 of said three-armed plates. A pivot pin 38 passes through bushing 34 and sides 21, 22 and is suitably secured against relative axial movement with respect to said sides. Spacer bushings 39 may be used to prevent contact between arms 32, 33 and the sides 21 and 22. A bearing 40 which, if desired, may be of an anti-friction type, is fixed against rotation in bushing 35 by a set screw 41, arbor 11 passing through bushing 40 and being freely rotatable therein.

Arbor 11 extends through aligned slots 42 in sides 21, 22 and has a drive pulley 43 secured to one end thereof and a hub 44 secured inwardly of the threaded other end 45. Saw 10 is clamped against hub 44 by a washer 46 and a nut 47. Suitable means known to those skilled in the art may be used to prevent axial movement of the arbor 11 relative to the three-armed plates 32 and 33.

The third arm 48 of each plate 32, 33 pivotally supports a reduced end (not shown) of a nut 49 having a transverse threaded opening 50 through which passes the saw elevating screw 51. Said saw elevating screw 51 extends outwardly from the end plate 25 through a strap 52 which has its parallel sides welded or otherwise secured to sides 21 and 22. As shown more clearly in Fig. 1, screw 51 extends through an opening 53 in the frame 14 and has a crank wheel 54 secured to the free end thereof by which the screw may be turned. Suitable stops 55, 56 on screw 51, which may take the form of pairs of nuts locked together, limit the movement of screw 51 through nut 49 and thereby limit the distance through which saw 10 may be raised or lowered. A spring 57 is compressed between the cross bar 58 of strap 52 and a washer 59 threaded over screw 51 and adjustably supported thereon against axial movement by lock nuts 60, spring 57, through screw 51, urges a friction washer 61 against the outer surface of cross bar 58, the washer 61 being held against axial movement in the opposite direction by a pin 62. Washer 61 functions to introduce a predetermined resistance to the turning movement of screw 51 and the combined spring 57 and washer 61 serve to fix screw 51 axially relative to mechanism 12.

It may be apparent from the description thus far given that, depending upon the direction in which screw 51 is turned, nut 49 will be moved to the left or to the right thereon. Inasmuch as screw 51 is axially fixed relative to cross bar 58 by spring 57 and the associated washers 59 and 61, arms 32, 33 will be rotated about the pivot pin 38 by the axial movement of nut 49 and such rotation will result in a vertical component of movement of spindle 11 relative to the mechanism 12.

The tilting movement of saw 10 relative to table 15 may be accomplished by the means and in the manner now to be described.

Secured to end plates 24 and 25 by spot welding or the like are trunnions 63 and 64 respectively, said trunnions preferably being in the form of arcuately shaped plates. Trunnion cradles 65 and 66 (Fig. 1) are bolted to the underside of the table 13, and, as shown more clearly in Fig. 5, are provided with arcuate slots 67 to receive the similarly shaped trunnions 63 and 64. Said cradles are of identical construction and are preferably made as single piece stampings with spaced bent-over attaching ears 75, 76 by which the cradles may be secured to the underside of table 13 as aforesaid. The disposition and length of the slots 67 are such that the trunnions may assume different positions in the cradles varying from a position corresponding to a vertical plane of operation of saw 10 to a position corresponding to a 45° angle of the plane of the saw relative to table top 15.

Inasmuch as screw 51 is constrained to move with the mechanism 12 during the tilting movement of the latter, opening 53 in the front of frame 14 is likewise arcuately shaped, as shown in Fig. 2. Suitable known means, shown only schematically at 68, may be employed to lock the strap 52 to the front of frame 14 after the desired angular adjustment of saw 10 has been made. The angular position of the saw 10 relative to table top 14 may be indicated by a pointer 69 movable with strap 52 in any suitable manner (not shown) and moving over a graduated scale 70 affixed to frame 14.

It is contemplated, however, that as an alternative arrangement the mechanism 12 may be adjusted to a tilted position directly by a screw in the same manner as the arms 32, 33. To this end, mechanism 12 has secured to plate 25 thereof an inverted U-shaped strap 71, between the sides of which is pivotally mounted a nut 72, Figs. 3 and 5, having a threaded transverse opening 73 therein. Thus, if desired, a screw similar in all respects to screw 51 and its associated crank wheel 54, may be affixed to the side 74 of frame 14 and made to cooperate with the threaded opening 73 in nut 72 to swing the mechanism 12 about its trunnions 63 and 64 and their cradles 65, 66 to alter the angle of the plane of saw 10 relative to table top 15.

It may be observed that mechanism 12 is supported entirely from table 13 and hence is not dependent upon any precise dimensional relationship between frame 14 and table 13. The result of this construction is to provide greater rigidity for mechanism 12 and to require less close machining and locating of bolt holes than would be the case if part of the mechanism were secured to frame 14 and the remainder were secured to table 13. The assembly of the saw is also simplified in that no adjustment of the saw relative to its slot in table 13 is necessary. The disclosed construction also gives greater freedom in the design of the frame, and it is less likely to result in binding of one part on another due to shifting of the frame relative to the table 13.

It is to be understood that the foregoing description is merely illustrative of a preferred embodiment of this invention and that the scope of this invention is not to be limited thereto, but is to be determined by the appended claim.

We claim:

A supporting mechanism for the arbor of a circular saw, said mechanism comprising a substantially rectangular box having parallel side plates, end plates extending across the ends of the sides and having bent-over tabs which overlie the sides and which are secured thereto, each said end plate extending beyond one of said sides, an arm disposed between and parallel to the sides and comprising spaced plates and spacers between the plates, a pivoted support on the said parallel sides for the arm, said saw arbor being rotatably mounted on said arm, a nut rotatably mounted on said arm, a U-shaped strap having its ends secured to the said sides, a screw, means for rotatably securing said screw to the strap with its axis substantially retained between the sides of the strap and its end threaded into said rotatable nut, arcuate shaped trunnions secured to the end plates over the extending regions thereof, and fixed trunnion cradles having arcuate slots to receive the respective trunnions in arcuately sliding relation therein.

References Cited in the file of this patent

UNITED STATES PATENTS

| | | |
|---|---|---|
| 2,261,696 | Ocenasek | Nov. 4, 1941 |
| 2,530,290 | Collins | Nov. 14, 1950 |
| 2,577,206 | Patterson | Dec. 4, 1951 |
| 2,626,639 | Hess | Jan. 27, 1953 |
| 2,695,638 | Gaskell | Nov. 30, 1954 |
| 2,711,762 | Gaskell | June 28, 1955 |